US008726244B2

(12) United States Patent
Zoller et al.

(10) Patent No.: US 8,726,244 B2
(45) Date of Patent: May 13, 2014

(54) SOFTWARE BREAKPOINT HANDLING BY ELIMINATING INSTRUCTION REPLACEMENT AND EXECUTION UNDER CERTAIN CONDITIONS

(75) Inventors: Jeffrey David Zoller, Chelmsford, MA (US); Kenneth Edwin Poole, rumford, RI (US); Vincent Michael Del Vecchio, Watertown, MA (US); Zhian Luo, Sharon, MA (US)

(73) Assignee: MediaTek Singapore Pte. Ltd., Singapore (SG)

( * ) Notice: Subject to any disclaimer, the term of this patent is extended or adjusted under 35 U.S.C. 154(b) by 345 days.

(21) Appl. No.: 13/293,099

(22) Filed: Nov. 9, 2011

(65) Prior Publication Data
US 2013/0117732 A1 May 9, 2013

(51) Int. Cl.
*G06F 9/44* (2006.01)
*G06F 11/00* (2006.01)
*G06F 11/36* (2006.01)

(52) U.S. Cl.
CPC .......... *G06F 11/3636* (2013.01); *G06F 11/362* (2013.01)
USPC ........... 717/129; 717/124; 717/127; 714/38.1

(58) Field of Classification Search
CPC .................... G06F 11/362; G06F 11/3636
USPC ............... 717/124–135; 714/37, 38.1
See application file for complete search history.

(56) References Cited

U.S. PATENT DOCUMENTS

| 6,516,408 | B1 * | 2/2003 | Abiko et al. | 712/227 |
| 6,934,886 | B2 * | 8/2005 | Ok | 714/34 |
| 7,296,259 | B2 * | 11/2007 | Betker et al. | 717/129 |
| 2002/0152427 | A1 * | 10/2002 | Ok | 714/34 |
| 2004/0049712 | A1 * | 3/2004 | Betker et al. | 714/35 |

OTHER PUBLICATIONS

Gilpin, Andrew, "Debugging Under Unix: gdb Tutorial," <http://www.cs.cmu.edu/~gilpin/tutorial/>, Apr. 7, 2004, p. 1-6.*
Angepat et al., "NIFD: Non-Intrusive FPGA Debugger Debugging FPGA 'Threads' for Rapid HW/SW Systems Prototyping," 2010, IEEE, p. 356-359.*

* cited by examiner

*Primary Examiner* — Qing Chen
(74) *Attorney, Agent, or Firm* — Winston Hsu; Scott Margo

(57) ABSTRACT

The debugging system is provided that includes a debugging module that receives an application having one or more software breakpoints such that when a target system encounters the one or more software breakpoints the debugging module starts handling of the one or more software breakpoints. A determination is made as to whether the one or more software breakpoints is a selective software breakpoint, if it is determined that the selective software breakpoint has been encountered, the debugging module eliminates instruction replacement for all other remaining breakpoints and execution of the original instruction of the application at the encountered breakpoint or eliminates instruction replacement for all other remaining breakpoints and reinstalls the encountered breakpoint.

14 Claims, 3 Drawing Sheets

SOFTWARE BREAKPOINT HANDLING BY ELIMINATING INSTRUCTION REPLACEMENT AND EXECUTION UNDER CERTAIN CONDITIONS

BACKGROUND

The invention is related to the field of software breakpoint handling, and in particular to improving performance of software breakpoint handling by eliminating instruction replacement and execution under certain conditions.

Some debuggers, like GDB for example, offer an option that determines how breakpoints are treated when the processor halts. The breakpoints can be either left in memory or removed from memory. If the breakpoints are left in memory and the debugger is asked to read memory in an area where a breakpoint exists, the debugger will mask the breakpoint with the original memory contents before displaying it to the user.

The invention improves over the prior art by increasing the speed and performance in handling specific kinds of breakpoints by eliminating instruction replacement and execution under certain conditions.

SUMMARY

According to one aspect of the invention, there is provided a debugging system. The debugging system includes a debugging module that receives an application comprising one or more software breakpoints such that when a target system encounters the one or more software breakpoints the debugging module starts handling of the one or more software breakpoints. A determination is made as to whether the one or more software breakpoints is a selective software breakpoint, if it is determined that the selective software breakpoint has been encountered, the debugging module eliminates instruction replacement for all other remaining breakpoints and execution of the original instruction of the application at the encountered breakpoint or eliminates instruction replacement for all other remaining breakpoints and reinstalls the encountered breakpoint.

According to another aspect of the invention, there is provided a method of performing the operations of a debugging system. The method includes providing an application for execution and receiving the application using a debug module, the application comprising one or more software breakpoints such that when a target system encounters the one or more software breakpoints the debugging module starts handling of the one or more software breakpoints. Also, the method includes determining whether the one or more software breakpoint is a selective software breakpoint, if it is determined that a selective software breakpoint has been encountered, the debugging module eliminates instruction replacement for all other remaining breakpoints and execution of the original instruction of the application at the encountered breakpoint or eliminates instruction replacement for all other remaining breakpoints and reinstalls the encountered breakpoint.

These and other objectives of the present invention will no doubt become obvious to those of ordinary skill in the art after reading the following detailed description of the preferred embodiment that is illustrated in the various figures and drawings.

DETAILED DESCRIPTION

The invention provides a technique to handle a specific software breakpoint based on the breakpoint's individual attributes and not on a global option that affects all breakpoints. In particular, the invention relies on two specific scenarios of software breakpoints usage to ascertain on how to proceed and process the remaining breakpoints in an instruction set provided for processing. Depending which breakpoint scenario is encountered, the debugger will determine on how to proceed in handling the other remaining breakpoints in a loaded application.

Figure 1:
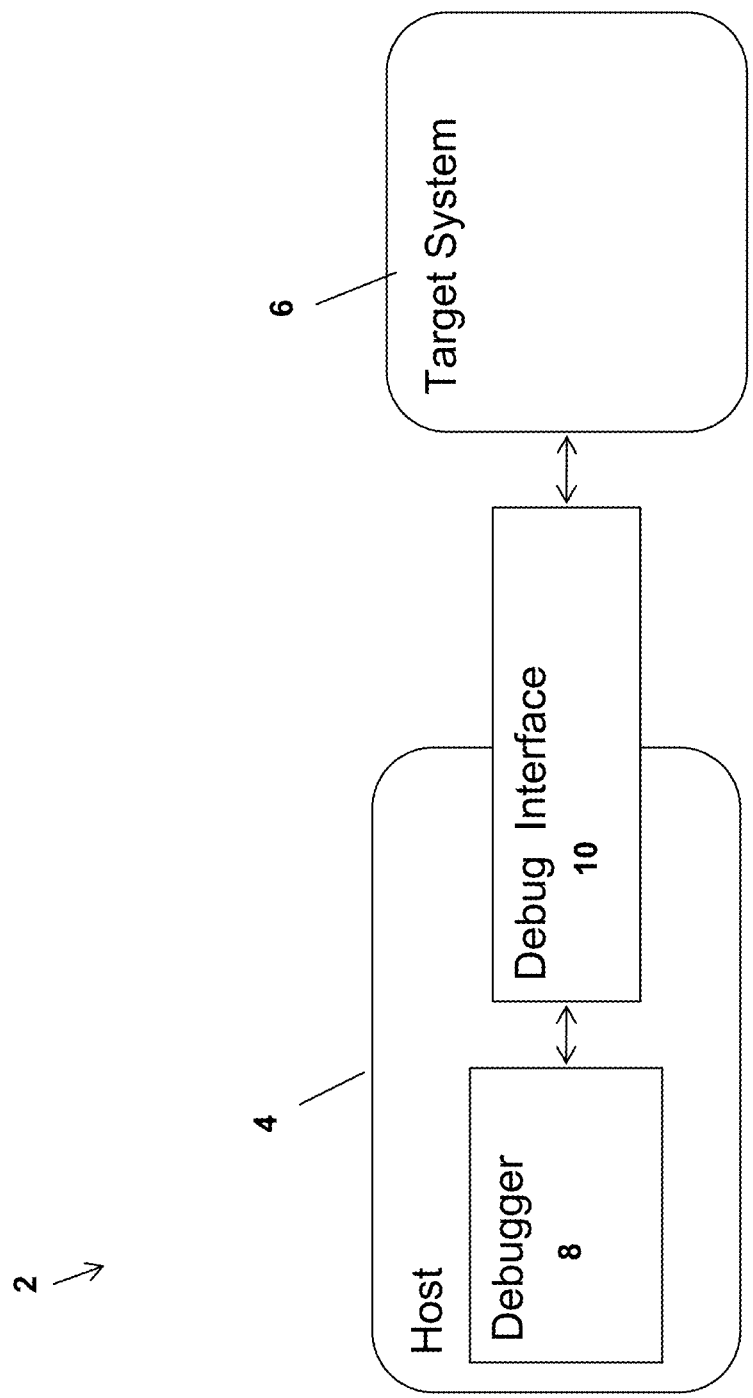
FIG. 1 is a schematic diagram illustrating the debugging system used in accordance with the invention.

FIG. 1 is a schematic diagram illustrating the debugging system 2 used in accordance with the invention. The debugging system 2 includes a host 4 comprising a computer controlled by the user, typically a PC having a processor, a processor memory, a hard disk storage, and other peripheral devices. The host 4 executes using its processor and processor memory a debugger 8 connected to a debug interface 10. The debugger 8 is a software application running on the host 4 used to control a target system 6 and display information that allows a user to diagnose and analyze the application code that will run on the target system 6. The debug interface 10 is an interface module between the target system 6 and the debugger 8 running on the host 4.

The target 6 executes a loaded application that can include a software breakpoint. The software breakpoint is a special instruction that when executed causes a processor to enter a debug mode where the debugger 8 can take control. Typically software breakpoints are set by saving the application's original instruction and replacing it with a special breakpoint instruction. The debugger may also support automatic breakpoints that are breakpoints being set automatically based on the existence of a predefined label in the loaded application.

If certain predefined labels exist, the debugger 8 or debug interface 10 can set breakpoints at these locations automatically without the user having to set them explicitly. When an automatic or conditional software breakpoint is discovered the debugger 8 or debug interface 10 can evaluate certain conditions based on address, attributes, and possibly data from the processor itself and decide whether the processor should remain halted or be returned to a running state automatically without user interaction.

Currently in the prior art, when a breakpoint event is triggered in the target system, the debugger or debug interface can make decisions on how to handle the breakpoint event based on the address at which the event occurred. If the breakpoint is an automatic or conditional breakpoint the debugger 8 or debug interface 10 can evaluate the conditions of the breakpoint and optionally set the processor running again without user intervention after performing some specific actions. Whenever a breakpoint is discovered and the processor halts, all other breakpoints in the system are removed from memory and replaced by their original, saved instructions. If the processor is to be set running again it must first single step the instruction where it stopped in order to get beyond the address of the current breakpoint, then all of the breakpoints are written to memory and again the original instructions are saved for later use. The processor can then be set running.

The invention identifies two scenarios of breakpoint usage, the first scenario of breakpoint usage is a breakpoint placed on an instruction having no side-effects on the state of the processor of the target system when it is executed, such as a NOP. When a breakpoint is placed on a NOP the breakpoint no longer needs to be removed from memory when it is hit and we can also skip the single step which results in faster handling of the breakpoint because the NOP acts as a placeholder for the breakpoint and has no side effects on the application if it is not executed. The second scenario of breakpoint usage is using a Lightweight Breakpoint (LWBP) which simplifies the handling of breakpoints. Typically when a breakpoint is hit and the processor halts, all other breakpoints in the system are removed from memory and replaced by their original instructions. When a breakpoint flagged as a LWBP is hit the Debugger/Debug Interface will remove just the LWBP and wait until a decision is made that the processor is indeed staying halted before removing all other breakpoints in the system from memory. If the decision is made that the processor should be set running again after handling the LWBP then only the LWBP itself needs to be reinstalled. Automatic Breakpoints can also be a LWBP, but not all LWBPs need to be Automatic.

Figure 2:
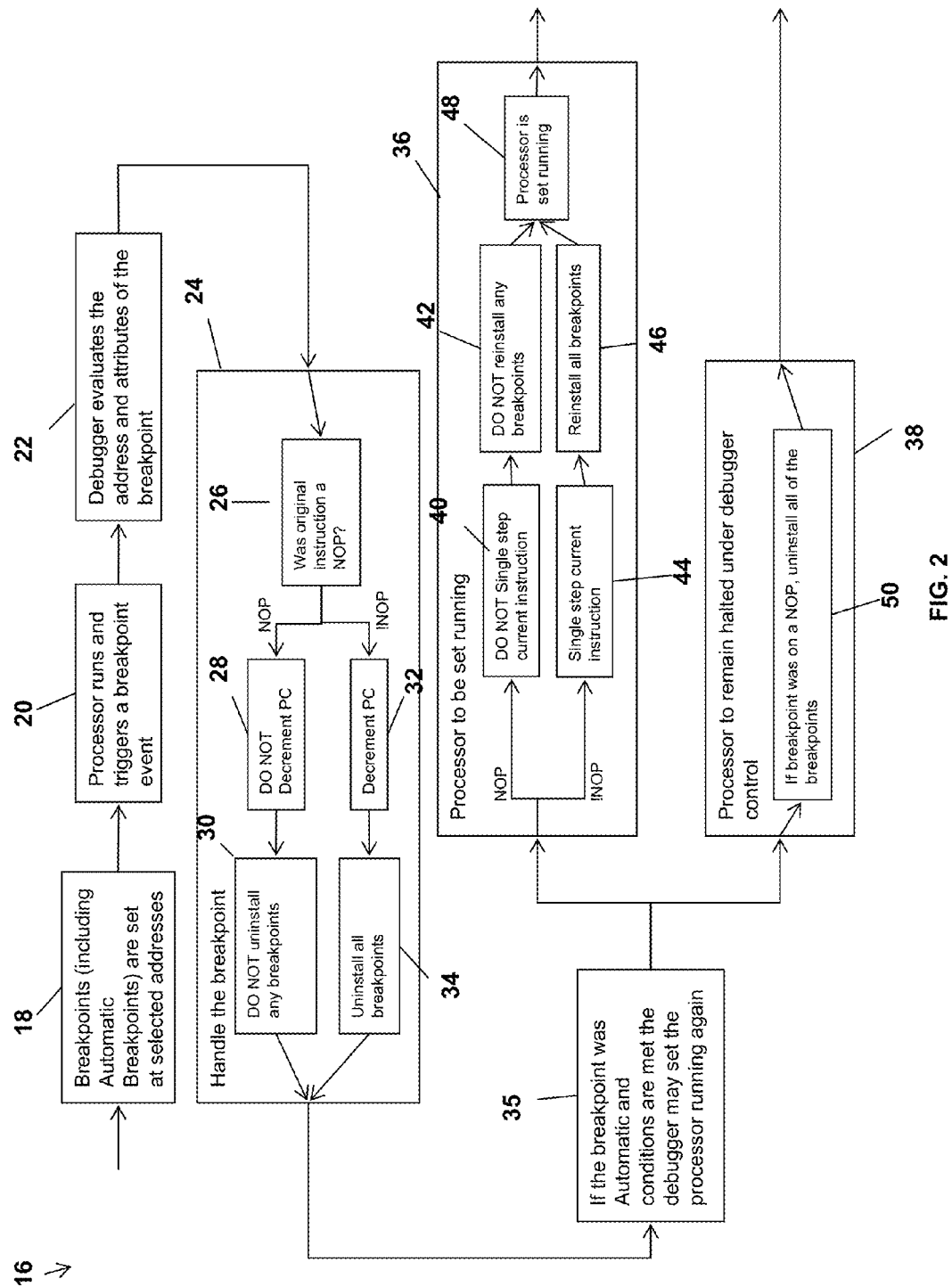
FIG. 2 is a process flow diagram illustrating the steps performed by the inventive debugging system when a software breakpoint placed on a NOP is discovered during an execution of a loaded application.

FIG. 2 is a process flow diagram illustrating the steps performed by the inventive debugging system 2 when a software breakpoint on a NOP is discovered during an execution of a loaded application. The process flow 16 shows a loaded application having breakpoints, including automatic breakpoints, being set at selected addresses, as shown in step 18. The processor of the host 4 is executing the debugger 8. The application is executing on the target system 6. The breakpoint is triggered when the application executing on the target system 6 executes a software breakpoint instruction. This activates the debugger 8 that evaluates the address and attributes of the breakpoint, as shown in step 22. The debugger 8 activates a breakpoint handler that performs actions shown in step 24. After receiving information from the debugger 8, the breakpoint handler determines whether the original instruction is a NOP instruction, as shown in step 26. If it is determined the original instruction is a NOP, the PC is not decremented, shown in step 28, and any remaining breakpoints are not uninstalled as shown in step 30. If it is determined the breakpoint is not a NOP, the PC is decremented, as shown in step 32, and all breakpoints are uninstalled, as shown in step 34.

Moreover, step 35 determines if the breakpoint is an automatic breakpoint and conditions are met so as to allow a debugger 8 to set the processor to run again. If the processor is to be set to run again, the process flow 36 illustrates the steps needed to accomplish this task and process 38 shows the step needed if the processor is to remain halted under debugger 8 control. In particular, process flow 36 shows if the automatic break point is a NOP instruction, single step current instruction is not performed, as shown in step 40, and no breakpoints are reinstalled, as shown in step 42. The processor is set running as shown in step 48. If the automatic breakpoint is determined, as shown in process flow 36, to not be a NOP instruction then single step the current instruction is performed, as shown in step 44, and reinstall all breakpoints, as shown in step 46. Again, the processor is set running as shown in step 48. The process flow 38 shows the step needed when a processor is to remain halted under debugger 8 control. In this case, if the breakpoint is on a NOP, uninstall all of the breakpoints, as shown in step 50.

When a breakpoint is placed on a NOP the breakpoint no longer needs to be removed when it is encountered and one can also skip the single step which results in faster handling of the breakpoint because the NOP acts as a placeholder for the breakpoint and has no side effects on the application if it is not executed. This is especially useful when the breakpoint is an automatic or conditional breakpoint that is encountered repeatedly and the debugger 8 or debug interface 10 typically resumes the application automatically after handling the breakpoint.

Figure 3:
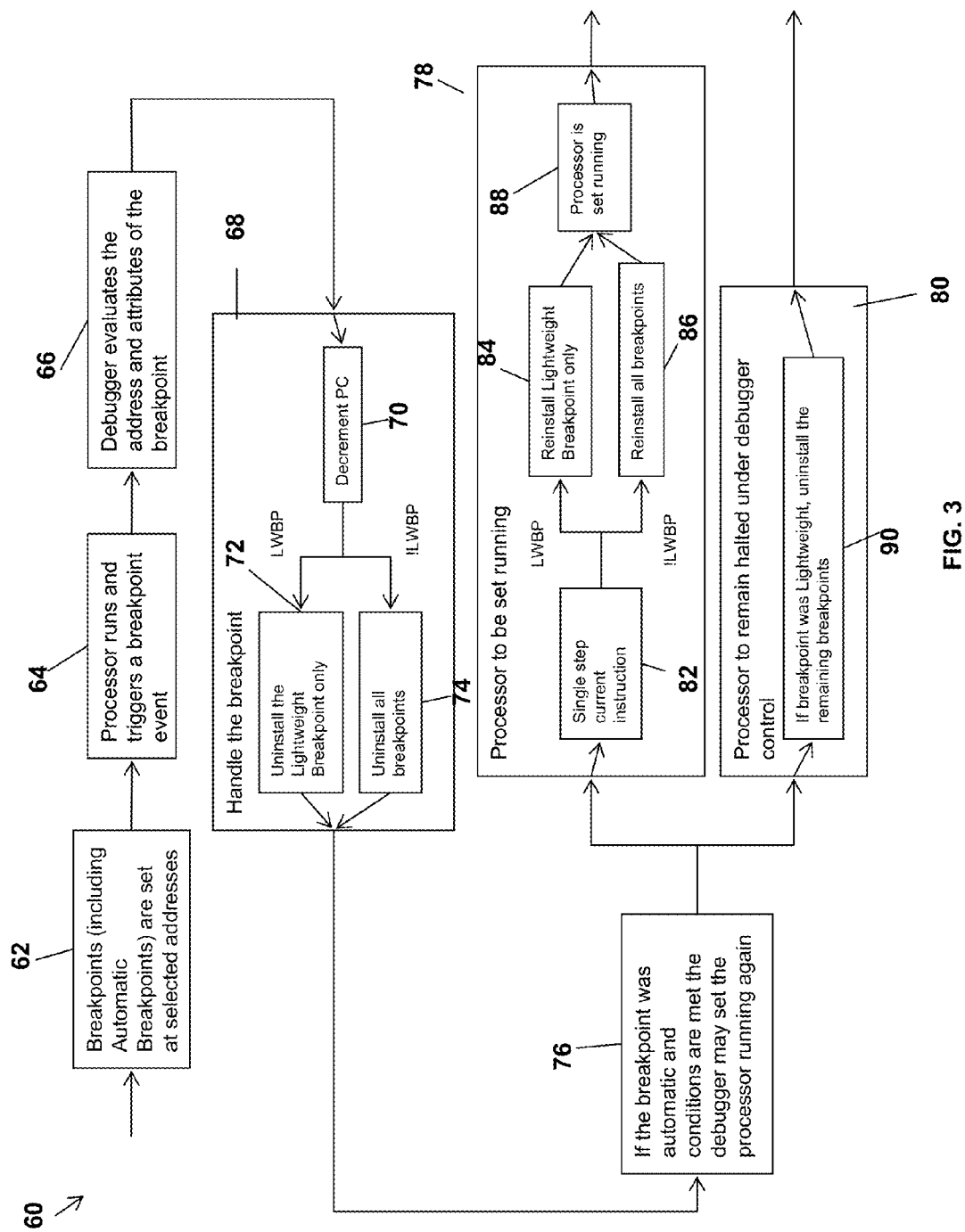
FIG. 3 is a process flow diagram illustrating the steps performed by the inventive debugging system when a lightweight breakpoint is encountered during an execution of a loaded application.

FIG. 3 is a process flow diagram 60 illustrating the steps performed by the inventive debugging system 2 when a lightweight breakpoint (LWBP) is encountered during an execution of a loaded application. The process flow 60 shows a loaded application having breakpoints, including automatic breakpoints, being set at selected addresses, as shown in step 62. The processor of the host 4 is executing the debugger 8. The application is executing on the target system 6. The breakpoint is triggered when the application executing on the target system 6 executes a software breakpoint instruction. This activates the debugger 8 that evaluates the address and attributes of the breakpoint, as shown in step 66. The debugger 8 activates a breakpoint handler that performs actions shown in step 68. The breakpoint handler decrements the PC and determines if a lightweight breakpoint (LWBP) has been encountered, as shown in step 70. If a LWBP has been encountered, only the LWBP is uninstalled, as shown in step 72, otherwise if a LWBP has not been encountered all breakpoints are uninstalled, as shown in step 74.

Moreover, Step 76 further determines if the breakpoint is an automatic breakpoint and if conditions are met so as to allow a debugger 8 to set the processor to run again. If the processor is to be set to run again, the process flow 78 illustrates the steps needed to accomplish this task and process 80 shows the step needed if the processor is to remain halted under debugger 8 control. In particular, process flow 78 shows the single step current instruction being performed, as shown in step 82, and if the automatic breakpoint is a LWBP, the LWBP is reinstalled only, as shown in step 84. The processor is set running as shown in step 88. If the automatic breakpoint is determined, as shown in step 82, to not be a LWBP, then reinstall all breakpoints, as shown in step 86. Again, the processor is set running as shown in step 88. The process flow 80 shows the step needed when a processor is to remain halted under debugger 8 control. In this case, if the breakpoint is a LWBP, uninstall all of the remaining breakpoints, as shown in step 90.

In this scenario the performance is gained by not having to swap out all of the installed breakpoints when a LWBP is encountered. Instead only the LWBP is initially removed. Further gains are made when the debugger 8 decides to automatically set the processor running again. These gains are made by not having to reinstall all of the breakpoints. Instead only the LWBP is reinstalled. Conditional software breakpoints and software breakpoints used for File I/O operations are good examples where a LWBP can provide improvement.

Although the present invention has been shown and described with respect to several preferred embodiments thereof, various changes, omissions and additions to the form and detail thereof, may be made therein, without departing from the spirit and scope of the invention.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A debugging system comprising:
a debugging module that receives an application comprising one or more software breakpoints such that when a target system encounters the one or more software breakpoints, the debugging module starts handling of the one or more software breakpoints by determining whether the one or more software breakpoints is a selective software breakpoint, if it is determined that the selective software breakpoint has been encountered, the debugging module eliminates instruction replacement for all other remaining breakpoints and execution of an original instruction of the application at the encountered selective software breakpoint or eliminates instruction replacement for all other remaining breakpoints and reinstalls the encountered selective software breakpoint, wherein the selective software breakpoint comprises a lightweight breakpoint; and
a host system that executes the debugging module, wherein the debugging module leaves all breakpoints installed except the lightweight breakpoint until a determination is made as to remain halted or continue running a processor on the host system.

2. The debugging system of claim 1, wherein the host system uses the debugging module to control the target system.

3. The debugging system of claim 1, wherein the debugging module comprises a debugger and a debug interface.

4. The debugging system of claim 1, wherein the selective software breakpoint replaces an instruction having no side-effects on a state of a processor of the target system.

5. The debugging system of claim 4, wherein the debugging module leaves all breakpoints installed until a determination is made as to remain halted or continue running a processor on the target system.

6. The debugging system of claim 5, wherein the debugging module decides the processor of the target system should be set running automatically and resumes executing the application automatically after handling the selective software breakpoint.

7. The debugging system of claim 1, wherein the debugging module decides the processor of the target system should be set running automatically and resumes executing the application with the lightweight breakpoint reinstalled and the other remaining breakpoints remaining installed.

8. A method of performing operations of a debugging system comprising:

providing an application for execution;
receiving the application using a debugging module, wherein the application comprises one or more software breakpoints such that when a target system encounters the one or more software breakpoints, the debugging module starts handling of the one or more software breakpoints by determining whether the one or more software breakpoints is a selective software breakpoint, if it is determined that a selective software breakpoint has been encountered, the debugging module eliminates instruction replacement for all other remaining breakpoints and execution of an original instruction of the application at the encountered selective software breakpoint or eliminates instruction replacement for all other remaining breakpoints and reinstalls the encountered selective software breakpoint, and wherein the selective software breakpoint comprises a lightweight breakpoint; and
executing the debugging module by a host system, wherein the debugging module leaves all breakpoints installed except the lightweight breakpoint until a determination is made as to remain halted or continue running a processor on the host system.

9. The method of claim 8, wherein the host system uses the debugging module to control the target system.

10. The method of claim 8, wherein the debugging module comprises a debugger and a debug interface.

11. The method of claim 8, wherein the selective software breakpoint replaces an instruction having no side-effects on a state of a processor of the target system.

12. The method of claim 11, wherein the debugging module leaves all breakpoints installed until a determination is made as to remain halted or continue running a processor on the target system.

13. The method of claim 12, wherein the debugging module decides the processor of the target system should be set running automatically and resumes executing the application automatically after handling the selective software breakpoint.

14. The method of claim 8, wherein the debugging module decides the processor of the target system should be set running automatically and resumes executing the application with the lightweight breakpoint reinstalled and the other remaining breakpoints remaining installed.

* * * * *